(12) United States Patent
Elsaadani et al.

(10) Patent No.: US 11,152,138 B2
(45) Date of Patent: Oct. 19, 2021

(54) FIRE RATED RADIO FREQUENCY CABLE

(71) Applicant: NOKIA SHANGHAI BELL CO., LTD., Shanghai (CN)

(72) Inventors: Asaad Elsaadani, Meriden, CT (US); Mihirraj Joshi, Middletown, CT (US); Joel Cacopardo, Hamden, CT (US); Erhard Mahlandt, Hannover (DE); Thomas McKeon, Wallingford, CT (US); Yin-Shing Chong, Middletown, CT (US)

( * ) Notice: Subject to any disclaimer, the term of this patent is extended or adjusted under 35 U.S.C. 154(b) by 0 days.

(21) Appl. No.: 16/644,232

(22) PCT Filed: Sep. 7, 2018

(86) PCT No.: PCT/CN2018/104657
§ 371 (c)(1),
(2) Date: Mar. 4, 2020

(87) PCT Pub. No.: WO2019/047929
PCT Pub. Date: Mar. 14, 2019

(65) Prior Publication Data
US 2020/0211739 A1    Jul. 2, 2020

Related U.S. Application Data

(60) Provisional application No. 62/556,296, filed on Sep. 8, 2017.

(51) Int. Cl.
*H01B 11/02*    (2006.01)
*H01B 11/18*    (2006.01)

(52) U.S. Cl.
CPC ..... *H01B 11/1869* (2013.01); *H01B 11/1865* (2013.01)

(58) Field of Classification Search
CPC . H01B 7/02; H01B 7/295; H01B 3/44; H01B 7/04; H01B 7/06; H01B 11/02; H01B 11/18; H01B 11/1869; H01B 11/1865
(Continued)

(56) References Cited

U.S. PATENT DOCUMENTS 2,576,163 A    11/1951    Weston et al.
4,549,041 A  * 10/1985   Shingo ..................... C08K 3/22
                                                174/113 R
(Continued)

FOREIGN PATENT DOCUMENTS

CN    200986608         12/2007
CN    201522890 U  *  1/2010  ............. H01B 11/18
(Continued)

OTHER PUBLICATIONS http://20omgb3m0i1zjvir92mikuij.wpengine.netdna-cdn.com/wp-content/uploads/2014/09/VITALink.pdf.
(Continued)

*Primary Examiner* — William H. Mayo, III
(74) *Attorney, Agent, or Firm* — Capitol Patent + Trademark Law Firm, PLLC

(57) ABSTRACT

A coaxial cable (10) includes an outer barrier (12, 14, 16) that seals the coaxial cable from air and protects the cable's conductors (18, 20) form oxidation in a fire. Such an outer protective barrier may include a fire retardant tape. A dielectric (22) separates the conductors and may comprise a ceramic (23) embedded in a dielectric material (25), or ceramic beads in a braided ceramic mesh.

22 Claims, 5 Drawing Sheets

(58) Field of Classification Search
USPC .................. 174/102 R, 107, 108, 109, 110 R
See application file for complete search history.

(56) References Cited

U.S. PATENT DOCUMENTS

| | | | | |
|---|---|---|---|---|
| 4,800,351 | A * | 1/1989 | Rampalli | H01Q 13/203 |
| | | | | 174/121 A |
| 4,806,416 | A | 2/1989 | Puzo | |
| 5,262,593 | A | 11/1993 | Madry et al. | |
| 5,422,614 | A * | 6/1995 | Rampalli | H01B 7/295 |
| | | | | 174/121 A |
| 6,346,671 | B1 | 2/2002 | Ahrens et al. | |
| 2002/0117325 | A1* | 8/2002 | Mennone | H01B 7/295 |
| | | | | 174/121 A |
| 2003/0122636 | A1 | 7/2003 | DiBenedetto | |
| 2004/0118591 | A1 | 6/2004 | Bufanda et al. | |
| 2005/0183878 | A1* | 8/2005 | Herbort | H01B 7/295 |
| | | | | 174/11 OR |
| 2014/0037956 | A1* | 2/2014 | Sopory | H01B 7/292 |
| | | | | 428/368 |
| 2016/0236019 | A1* | 8/2016 | Fyfe | B32B 7/08 |
| 2016/0329129 | A1* | 11/2016 | Osborne, Jr. | H01B 7/295 |

FOREIGN PATENT DOCUMENTS

| | | |
|---|---|---|
| CN | 202633485 | 12/2012 |
| CN | 203931596 | 11/2014 |
| CN | 104616823 | 5/2015 |
| CN | 204787819 | 11/2015 |
| CN | 205122263 | 3/2016 |
| CN | 106373650 | 2/2017 |
| CN | 206471151 | 9/2017 |
| EP | 0150879 | 8/1985 |
| JP | S5363685 U | 5/1978 |
| JP | H01109607 | 4/1989 |
| JP | H0727021 U | 5/1995 |
| JP | 2005302620 A | 10/2005 |

OTHER PUBLICATIONS https://www.anixter.com/en_us/products/CIS14A0102/RADIX-WIRE-CO/Multi-Pair-Multi-Conductor-Cable/p/FA-1402C-1-1S-2HR >.
https://www.rfparts.com/coax/heliaxcoax/heliax158inch/ava7rk-50.html.
https://www.nassaunationalcable.com/okotherm-cic-fire-resistant-cable-mc-hl-c-l-x.html.

* cited by examiner

FIRE RATED RADIO FREQUENCY CABLE

CROSS-REFERENCE TO RELATED APPLICATIONS

This application claims the benefit of International Application Number: PCT/CN2018/10465 7 filed on 7 Sep. 2018 (Jul. 9, 2018) which in turn claims the benefit of U.S. Provisional Application No. 62/556,296, filed Sep. 8, 2017, and herein incorporated by reference in its entirety.

BACKGROUND

Coaxial cable is used to transmit electrical signals. A coaxial cable is made up of a center (or inner) conductor that is encapsulated by a helically wound dielectric insulating material (hereinafter referred to simply as "dielectric"), or any other suitable extruded forms, of dielectric. The dielectric is overlaid with an outer conductor, which is annularly or helically corrugated. The dielectric is used to maintain a spacing (or gap) between the inner conductor and the outer conductor, where this spacing is necessary to obtain a prescribed characteristic impedance for the coaxial cable. The gap is often referred to as an "air gap", since it is desirable that air be the separator between the inner and outer conductors, notwithstanding the presence of the dielectric (which itself acts as a spacer). The entire assembly can be encased within an outer protective jacket.

Such cables, also known, as radio frequency (RF) coaxial cables, are used for in-building communication and often for emergency communication systems. Given their use of emergency communications, such RE coaxial cables are now being required to pass International Building Code (IBC)/International Fire Code (IFC), Local Building Code/Local Fire Code, National Fire Protection Association (NFPA) 72, Chapter 24, NFPA 1221, and potentially NFPA 5000.

However, conventionally-used dielectric cannot survive the extreme heat conditions presented during a fire (e.g., temperatures around 1850° F.), since such conventional dielectrics start to melt at around 300° F. When the dielectric melts, it fails in its purpose to keep the inner and outer conductors separated. Consequently, the inner conductor will short circuit with the outer conductor. When this happens, the coaxial cable is no longer usable for communication.

Some other known dielectrics may withstand the temperature of a fire, and have sufficient strength to maintain the characteristic impedance, but are unsuitable because they significantly attenuate signals transmitted via the coaxial cable at normal temperatures.

Generally, to meet fire codes, a cable needs to pass a 2-hour burn test (per Underwriters Laboratory (UL) 2196) at very high temperatures, a water hose blast test, and a subsequent functionality test. Currently, there is no existing RF coaxial cable in the industry that meets these standards because such RF coaxial Cables cannot survive extremely high temperatures for two hours in order to be certified in accordance with UL2196. Rather, existing cables will either burn or deform so that their inner conductor will form a short-circuit with an outer conductor, as mentioned above. Further, existing cables that use copper conductors are prone to oxidize, thereby causing the copper to react with air to form cupric oxide which makes the conductor very brittle. As a result, the conductor tends to break easily, in effect making the conductor an inoperable, electrical open circuit.

One attempted solution is to use UL-rated conduit with fire retardant tape or fire-rated construction materials within the buildings themselves and to route plenum coaxial cable inside. For example, the RF coaxial able may be placed in an expensive phenolic conduit. However, this arrangement has not been tested and is unlikely to pass NFPA 72, Chapter 24, NFPA 1221, or meet the NFPA 5000 requirements because the temperatures inside such a conduit will be too high, e.g., around 1850° F., causing the plastic dielectric material to melt, thereby resulting in a short-circuit being formed between, the inner conductor and the outer conductor, thus rendering the cable inoperable, and any emergency communication that it is used to carry equally unlikely. Other prior attempts to meet the above-mentioned specifications were not easily manufacturable, and/or resulted in the cable being very rigid.

SUMMARY

We have recognized that the problem of coaxial cables not being able to meet the above-noted requirements and remain functional may be overcome, in accordance with the principles of this disclosure, by a new coaxial cable that incorporates an outer protective structure or barrier to seal the coaxial cable assembly from air and protect the outer and inner conductors from oxidation in a fire. In illustrative embodiments of the disclosure, such an outer protective barrier may be made up of a fire retardant tape such as one or more of the following: a) a woven glass substrate coated on both sides with a fire retardant compound, e.g, a mica tape, b) stainless steel, e.g., 304, 316, or steel tape, e.g., A606, c) copper tape, e.g., 110, which may be the same alloy used for the outer conductor, d) copper clad with stainless steel tape, or e) woven glass, tape. Advantageously, the metal tap layer and the fire retardant layer (if any is incorporated) functions to seal the cable from air intrusion so as to prevent the oxidation and resulting degradation of outer/inner copper conductors, e.g., their conversion to cupric oxide, while also functioning to reinforce the structure of the cable during a fire and when the inventive cable is subjected to water jet spray, e.g., at the end of the Circuit integrity UL 2196 test.

In addition, in, various embodiments a fire retardant thermoplastic jacket material may also be used to further enhance an inventive cable's ability to withstand high temperature and provide additional structural rigidity.

In embodiments of the disclosure, a fire retardant tape may be incorporated to protect the jacket material from sharp edges of any incorporated metal tape and to help while the stainless steel tape, if employed.

In accordance with yet another embodiment, the inventive cable includes a dielectric that functions to separate the inner and outer conductors. Advantageously, such a dielectric is not affected by fire and can maintain its performance during a fire and the temperatures related thereto.

In more detail, in one embodiment a coaxial cable may comprise an inner conductor, an outer conductor provided around the inner conductor, a dielectric provided comprising at least one layer of tape arranged around the outer conductor, wherein the tape layer is configured to prevent oxidation of the conductors.

The tape layer may comprise at least three layers: (i) a proximal, with respect to the outer conductor, fire retardant tape layer, (ii) a distal, with respect to the outer conductor, fire retardant tape layer, and (iii) a metal tape layer between the proximal and distal fire retardant tape layers, for example.

The tape layer may comprise a number of different fire retardant materials or material combinations, such as a steel, stainless steel, copper or copper clad with stainless steel, woven glass, woven glass substrate coated on both sides with a fire retardant compound.

The dielectric may comprise, for example, an embedded ceramic, ceramic beads encapsulated with a fire retardant tape, (small) ceramic beads encapsulated in a flame retardant ceramic fiber mesh or ceramic beads inserted in a plastic dielectric tape. The small ceramic beads may comprise $Al_2O_3$, and the mesh may comprise $Al_2O_3$ and $SiO_3$, for example.

In an additional embodiment the inventive coaxial cable may comprise a fire retardant jacket configured annularly around the tape layer. Such a fire retardant jacket may comprise a fire retardant thermoplastic material, for example. When a fire retardant jacket is used, the inventive cable may further comprise a tape layer (e.g., a metal layer of tape) and an additional tape layer configured annularly between the tape layer and the fire retardant jacket.

In yet another additional embodiment, the outer conductor of the inventive coaxial cable may be coated with an intumescent fire retardant paint, or a jacket formed over the outer conductor of an intumescent fire retardant compound.

Accordingly, coaxial cables in accordance with embodiments of the disclosure are configured to survive and function in the face of the above-described tests and conditions.

DETAILED DESCRIPTION

The following merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Unless otherwise explicitly specified herein, the drawings are not drawn to scale.

In the description, identically numbered components within different ones of the figures refer to the same components.

Figure 1:
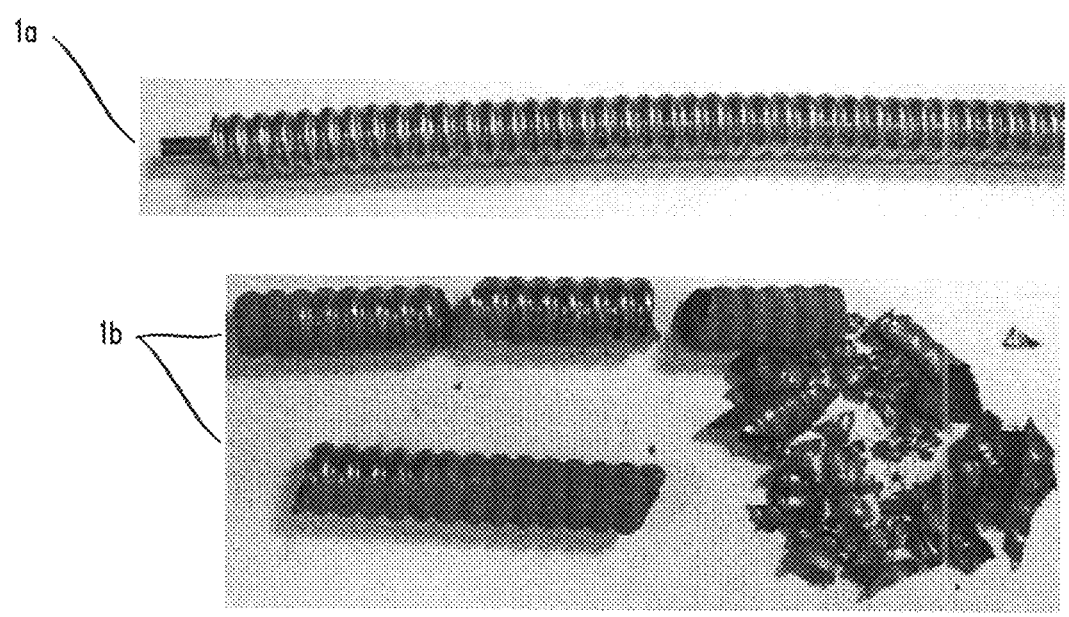
FIG. 1 shows an outer conductor that was subject to fire conditions.

FIG. 1 shows an example of an outer conductor 1a, 1b, where the same type of conductor is shown before (1a) and after (1b) exposure to air and high temperature, e.g., fire conditions. The conductor shown in (1b) illustrates the effects of the formation of cupric oxide from copper due to such conditions.

In accordance with the principles of the disclosure, a new coaxial cable is proposed that includes an outer structure or barrier that functions to seal the coaxial cable from air and protect an outer and inner conductor from oxidation during a fire. In illustrative embodiments of the disclosure such an outer protective barrier may include a fire retardant tape comprising one or more of the following: a) a woven glass substrate coated on both sides with a fire retardant compound, e.g., a mica tape, b) stainless steel, e.g., 304, 316, or steel tape, e.g., A606, c) copper tape, e.g, 110, which may be the same alloy used for the outer conductor, d) copper clad with stainless steel tape, or e) woven glass tape. Advantageously, the metal tape layer and the fire retardant tape layer (if any is incorporated) function to seal the cable from air intrusion so as to prevent the oxidation and resulting, degradation of outer/inner copper conductors (i.e., prevent or minimize their conversion to cupric oxide), while also functioning to reinforce the structure of the cable during a fire, and/or when the inventive cable is subjected to a water jet spray, e.g., at the end of the UL 2196 test.

Figure 2:
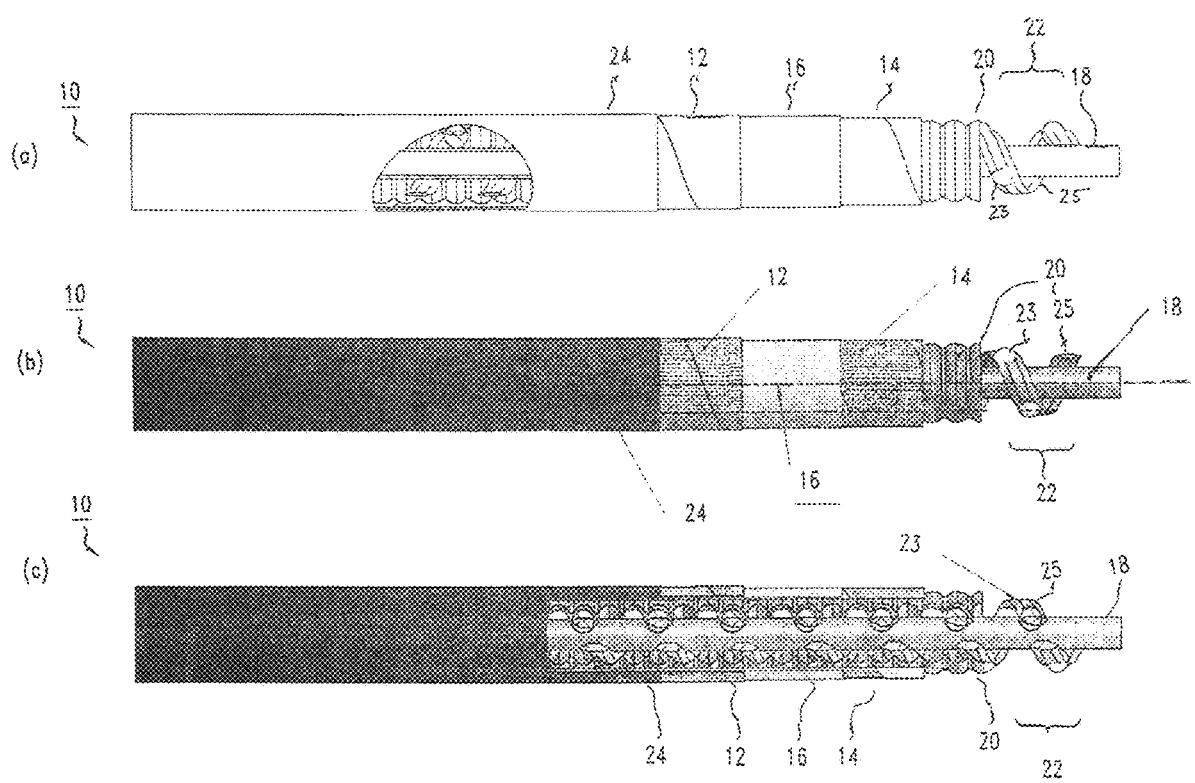
FIG. 2 shows an illustrative embodiment of a coaxial cable configured in accordance with the principles of the disclosure.
Figure 3:
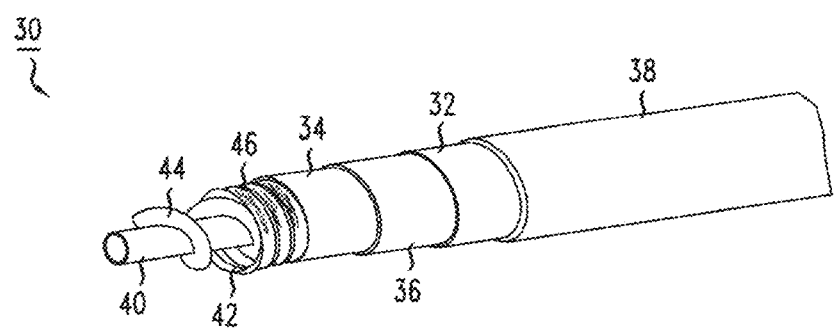
FIG. 3 shows another illustrative embodiment of a coaxial cable configured in accordance with the principles of the disclosure.
Figure 4:
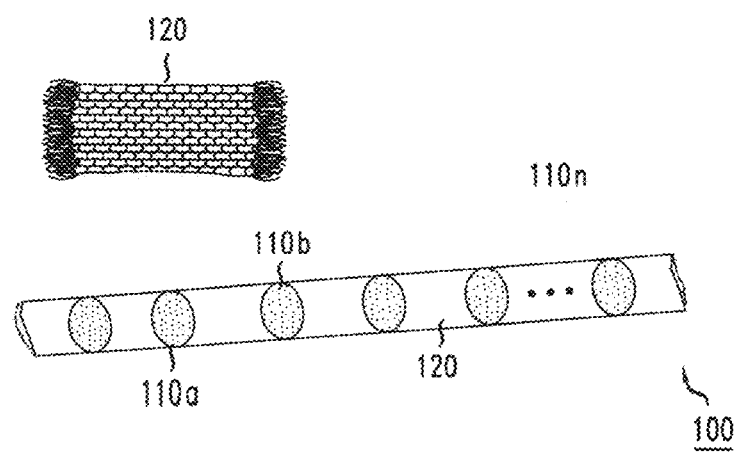
FIG. 4 shows an illustrative embodiment of a dielectric, that functions to separate inner and outer conductors, comprising small ceramic beads, e.g., $Al_2O_3$, encapsulated in a flame retardant ceramic fiber mesh, e.g., $Al_2O_3$ and $SiO_3$ in accordance with principles of the disclosure.

FIGS. 2-3 and 5-7 show various configurations of inventive coaxial cables in accordance with the principles of the disclosure, while FIG. 4 illustrates an exemplary configuration of a suitable dielectric.

FIG. 2 shows an illustrative, inventive cable 10 according to an embodiment of the disclosure. Inventive cable 10 is shown in a schematic view (a), an illustration (b), and a cut-away view (c) of the illustration of (b), the three views in combination illustrating inventive aspects of cable 10. As shown, an outer barrier may include two layers, denoted 12 and 14, of fire retardant tape (e.g., a mica-based tape) on either side of a stainless steel tape 16 (e.g., type 304, 316). Inner conductor 18 and outer conductor 20 are also shown, with a dielectric 22 disposed in the gap between inner conductor 18 and outer conductor 20. View (c) best illustrates the location of dielectric 22. Dielectric 22 may comprise ceramic beads 23 encapsulated within a fire retardant tape 25. Dielectric 22 functions to hold center conductor 18 in place with respect to outer conductor 20. It should be understood that other forms of ceramic beads, e.g., $Al_2O_3$, can be used.

The barrier may further include a fire retardant jacket material 24 that is configured to surround fire retardant tape layer 12. In an embodiment, stainless steel tape layer 16 may comprise a material that has a melting temperature of 1400-1455° C. (2550-2651° F.), which is much higher than the melting temperature of a pure copper conductor (1083° C., 1981° F.). Note that the UL 2196 test temperature is 1010° C. (1850° F.) and, thus, very close to the melting temperature of outer copper conductor 20.

In an embodiment, stainless steel tape 16 functions to shield outer conductor 20 from direct exposure to heat and air, and significantly reinforces the structural integrity of cable 10.

Fire retardant tape 14 between outer copper conductor 20 and stainless steel tape 16 functions to seal outer conductor 20 from air at extreme temperatures to prevent the formation of cupric oxide. Fire retardant tape 12 functions to project jacket material 24 from sharp edges of stainless steel tape 16 and also shield stainless steel tape 16.

In sum, the combination of fire retardant tapes 12 and 14 with fire retardant jacket 24 function to reinforce cable 10 and prevent copper conductors 18, 20 from oxidation and degradation.

Referring now to FIG. 3, there is shown another illustrative cable 30 according to an embodiment of the disclosure. Cable 30 comprises two layers of fire retardant tape 32, 34 (e.g., a mica-based tape, ceramic tape ($Al_2O_3$ and $SiO_3$), silica tape ($SiO_3$), or mesh braid (comprising $Al_2O_3$ and $SiO_3$), and the like) between which is a steel tape 36 (e.g., A606 alloy). Cable 30 further comprises a fire retardant jacket material 38 (e.g., flame retardant thermoplastic elastomer) that is configured to surround outer flame retardant tape 32. Similar to the arrangement of FIG. 2, the combination of fire retardant tapes 32 and 34, steel tape 36, and fire retardant jacket 38 functions to protect copper conductors 40, 42 from degradation and oxidation. Center conductor 40 is held in place by a dielectric 44 that helically surrounds conductor 40 and may comprise a ceramic rope, for example. It should be understood, however, that other forms of a ceramic may be used.

In embodiments of the disclosure, a substantially pure copper tape may be used in lieu of the steel or stainless steel tape. In such embodiments, because copper has a lower melting temperature than any of the steel tapes, the copper tape may start to bond to itself when subjected to the extreme temperatures of a fire. Such self-bonding functions to create a tightly-sealed copper tube around outer conductor 42. Outer fire retardant tape 32, which is distal to inner conductor 40, functions to form a bond with the copper tape and slow the formation of cupric oxide.

In an embodiment, inner fire retardant tape 34 which is provided between copper tape 36 and outer conductor 42, functions to bond both copper layers, and create a tight seal to prevent oxidation of inner conductor 40 and outer conductor 42.

In additional embodiments, fire retardant thermoplastic jacket 38 (e.g., elastomer) also functions to further enhance the inventive cable's ability to withstand high temperatures and provide additional structural rigidity. In embodiments of the disclosure, an additional fire retardant tape (not shown) may be included and function to protect jacket 38 from sharp edges of any metal tape and to help shield the tape.

In various embodiments of the disclosure, cable 30 may further comprise a thermal insulating layer 46 provided over outer conductor 42 that may be held in place by outer protective layers of tape 42, 44 to slow the rate of temperature increases to the inner core of cable 30. Such an insulating layer increases the performance of the cable during an extreme rise in temperature. In certain embodiments, thermal insulating layer 46 may comprise an intumescent fire retardant paint, or a separate jacket of an intumescent fire retardant compound disposed over outer conductor 42.

In accordance with another embodiment, cable 30 may include a dielectric 44 that functions to separate inner conductor 40 from outer conductor 42, where the dielectric may comprise an embedded ceramic, for example.

FIG. 4 shows an illustrative embodiment of a dielectric 100 that functions to separate an inner conductor from an outer conductor (the conductors not illustrated in FIG. 4, but are clearly shown in FIGS. 2 and 3). Dielectric 100 may comprise a plurality of small ceramic beads 110a-110n, where "n" indicates the last bead. In an embodiment, each bead may comprise $Al_2O_3$.

Dielectric 100 may further comprise a flame retardant ceramic fiber mesh 120 (e.g., made of $Al_2O_3$ and $SiO_3$), for example, where mesh 120 may be braided. Use of such a dielectric 100 to function as a separator helps to ensure that a required gap (e.g., air gap) between a center conductor and an outer conductor remains substantially constant, even in the presence of extreme temperatures inside the associated coaxial cable due to a fire.

Figure 5:
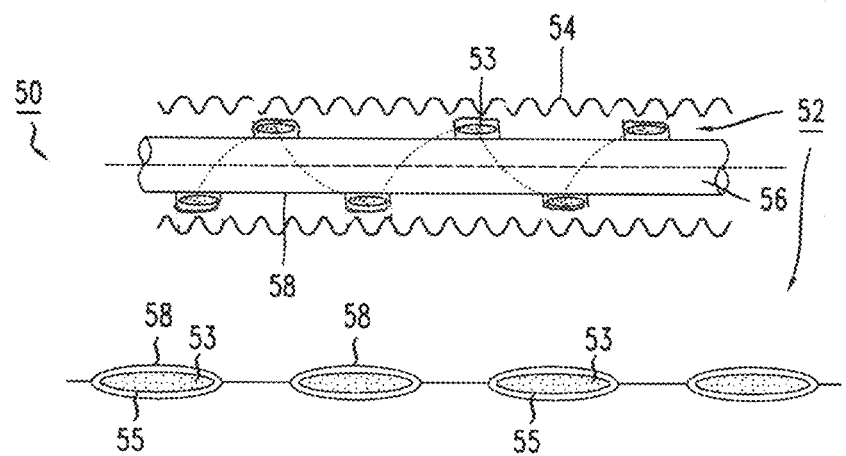
FIG. 5 shows another illustrative embodiment of a dielectric, that functions to which is further configured in an encapsulating flame retardant tape, in accordance with principles of the disclosure.

Referring to FIG. 5, there is shown another illustrative embodiment of a cable 50 that comprises a dielectric 52 that functions to separate an outer conductor 54 from an inner conductor 56. In this embodiment, dielectric 52 may comprise small ceramic beads 53 in a fiber mesh 55, which may be further encapsulated in flame retardant tape 58.

Figure 6:
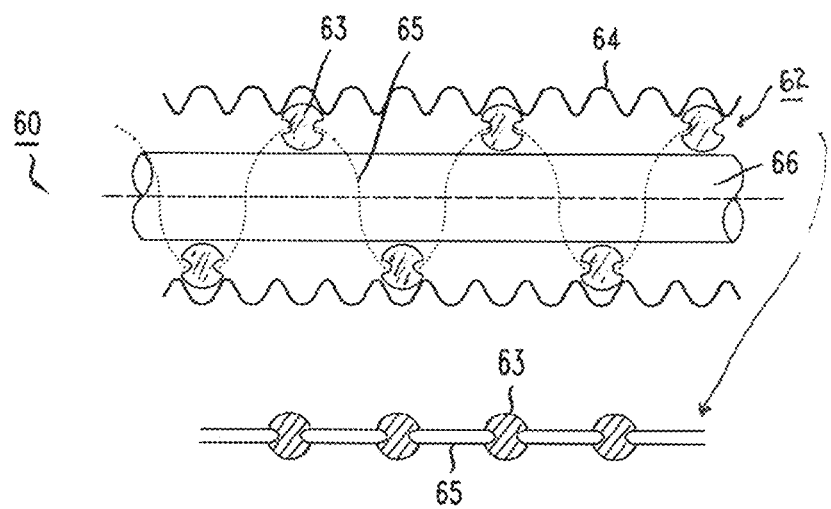
FIG. 6 shows another illustrative embodiment of a dielectric, that functions to separate inner and outer conductors, in which ceramic beads are inserted in plastic dielectric tape in accordance with principles of the disclosure.

FIG. 6 shows another illustrative embodiment of a cable 60 that comprises a dielectric 62 that functions to separate an outer conductor 64 from an inner conductor 66. Dielectric 62 may comprise ceramic beads 63 that may be inserted in a plastic, fire retardant dielectric tape 65. Dielectric 62 may comprise $Al_2O_3$ and $SiO_3$ (or only $Al_2O_3$, and may be configured as a rope or mesh. In the event of a fire, plastic dielectric tape 65 will melt, but beads 63, made of an aluminum oxide ceramic, for example, will not. Instead, beads 63 will function to maintain the necessary spacing between outer conductor 64 and inner conductor 66 and prevent a short circuit from being created between the two.

Further, dielectric 62 functions to hold inner conductor 66 and outer conductor 64 in place and allow for RF signals to pass through even at extreme temperatures, compared to existing cables.

In more detail, to permit proper transmission of electrical signals over a coaxial cable, the air cable between the cable's center (inner) conductor and outer conductor should be maintained in order to achieve a certain characteristic impedance of the cable. In experimental measurements conducted by the inventors, the change in the voltage standing wave ratio of samples of the inventive cable that include a dielectric that comprises ceramic beads encapsulated within a fire retardant tape did not exceed a value of 1.23.

The configuration of an RE cable determines the attenuation of an RE signal. Further, the attenuation due to a dielectric increases in proportion to the frequency of the RF signal being transmitted through the associated cable. In fact, the attenuation is independent of cable size and is determined only by the quantity and quality of the dielectric material.

The inventors also conducted tests and ⅞" or ½" coaxial cables that incorporated thick air dielectrics. The incorporation of stainless steel tape and flame retardant tapes provided protection for the cables (i.e., minimized degradation).

Figure 7:
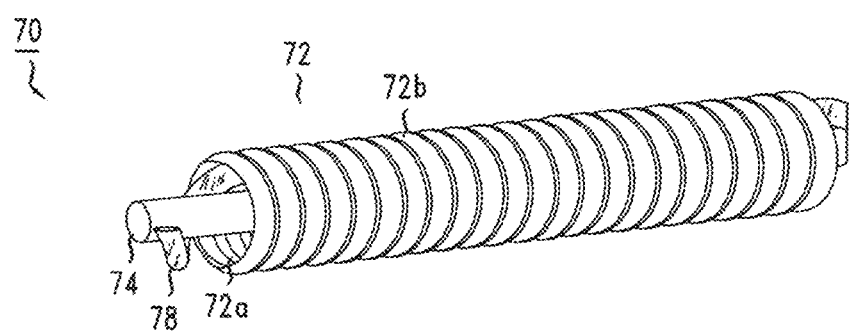
FIG. 7 shows another illustrative embodiment of a coaxial able configured in accordance with the principles of the disclosure.

FIG. 7 shows another illustrative embodiment of a coaxial cable 70 configured in accordance with the principles of the disclosure. In the embodiment of FIG. 7, rather than include an outer copper conductor and two layers of flame retardant, tapes and metal tape (e.g., stainless steel), cable 70 includes a tape 72 that includes both a layer of copper cladding 72a and a layer of stainless steel tape 72b. Tape 72 functions to reflect and resist heat generated by a fire, for example. Tape 72 may be configured annularly around an inner conductor 74 such that copper cladding 72a is proximal to (i.e., faces) inner conductor 74, while stainless steel tape 72b is proximal to (faces) an outer barrier (not shown). Cable 70 may also comprise a dielectric 78, described elsewhere herein. In one embodiment, dielectric 78 may comprise 99.9% Quartzel silica ($SiO_3$) or 3M Nextel 440 ceramic ($Al_2O_3$ and $SiO_3$) ropes.

One of ordinary skill in the art will readily recognize that in addition to the performance considerations of various outer jacket materials and insulating dielectrics, a coaxial cable must be flexible enough to be able to route through tight spaces during installation within a building, for example. Accordingly, various embodiments disclosed herein may be configured to satisfy industry-specified bend specifications and can be produced in large quantities.

What is claimed is:

1. A coaxial cable, comprising:
   an inner conductor;
   an outer conductor annularly arranged around the inner conductor;
   a dielectric separator arranged around at least a portion of the inner conductor so as to hold the outer conductor substantially separate from the inner conductor, wherein the dielectric separator comprises ceramic beads; and
   a tape layer including at least one layer of tape annularly arranged around the outer conductor, wherein the tape layer prevents the entry of air into the cable in the event of fire.

2. The invention as defined in claim 1 wherein the tape layer comprises at least three distinct sub-layers, a proximal sub-layer with respect to the outer conductor of a fire retardant material, a distal sub-layer with respect to the outer conductor of the fire retardant material, and a metal tape sub-layer disposed between the proximal and distal fire retardant tape sub-layers.

3. The invention as defined in claim 2 wherein the metal tape sub-layer includes a material selected from the group consisting of: steel, stainless steel, copper, and copper clad with stainless steel.

4. The invention as defined in claim 1 wherein the tape layer comprises at least one of a stainless steel layer of tape, a steel layer of tape, a copper layer of tape, and a copper clad stainless steel layer of tape.

5. The invention as defined in claim 1 wherein the tape layer comprises at least one of a woven glass substrate coated on both sides with a fire retardant compound and woven glass.

6. The invention as defined in claim 1 wherein the tape layer is fire retardant.

7. The invention as defined in claim 1 further comprising a fire retardant jacket annularly arranged around the tape layer.

8. The invention as defined in claim 7 wherein the fire retardant jacket further comprises a fire retardant thermoplastic material.

9. The invention as defined in claim 7 wherein the tape layer includes a metal layer of tape further comprising an additional tape layer annularly arranged between the metal layer of tape and the fire retardant jacket.

10. The invention as defined in claim 1 wherein the ceramic beads of the dielectric separator are inserted in a plastic dielectric tape.

11. The invention as defined in claim 1 wherein the ceramic beads of the dielectric separator are encapsulated within a fire retardant tape.

12. The invention as defined in claim 1 wherein the ceramic beads of the dielectric separator are encapsulated in a flame retardant ceramic fiber mesh.

13. The invention as defined in claim 1 wherein the outer conductor is coated with an intumescent fire retardant material.

14. The invention as defined in claim 13 wherein the intumescent fire retardant material is a paint coating applied on an external surface of the outer conductor.

15. The invention as defined in claim 13 wherein the intumescent fire retardant material comprises a jacket compound disposed to surround the outer conductor.

16. The invention as defined in claim 1 wherein the dielectric layer and the tape layer are such that the coaxial cable is configured to pass an Underwriters Laboratory (UL) 2196 test.

17. A coaxial cable, comprising:
   an inner conductor;
   an outer conductor annularly arranged around the inner conductor;
   a dielectric separator arranged around at least a portion of the inner conductor so as to hold the outer conductor substantially separate from the inner conductor; and
   a tape layer including at least a first tape layer and a second tape layer, the first tape layer and second tape layer being annularly arranged around the outer conductor
   wherein the first tape layer is comprised of at least one of the group consisting of: woven glass and a mica tape; and
   the second tape layer is a metal layer adjacent to and wrapped around the first tape layer, wherein the second tape layer partly overlaps itself and self-bonds in presence of heating in a fire to thereby seal itself so as to prevent the entry of air into the cable.

18. The coaxial cable of claim 17, wherein the second tape layer is comprised of at least one of the group consisting of: stainless steel tape, copper tape, copper clad with stainless steel.

19. The coaxial cable of claim 17, wherein the dielectric separator comprises ceramic beads.

20. A coaxial cable, comprising:
   an inner conductor;
   an outer conductor annularly arranged around the inner conductor, wherein the outer conductor is formed of copper clad stainless steel and arranged such that the copper is facing the inner conductor;
   a dielectric separator arranged around at least a portion of the inner conductor so as to hold the outer conductor substantially separate from the inner conductor; and
   a tape layer including at least one layer of tape annularly arranged around the outer conductor adjacent to its stainless steel, wherein the tape layer is comprised of a layer of material adjacent to the outer conductor that is at least one of the group consisting of: woven glass and a mica tape; and
   wherein the tape layer prevents the entry of air into the cable in the event of fire.

21. The coaxial cable of claim 20, wherein the dielectric separator comprises ceramic beads.

22. The coaxial cable of claim 20, wherein the tape layer further comprises a metal layer adjacent to and wrapped exterior to the at least one layer of tape annularly arranged around the outer conductor, the metal layer being arranged so that it partly overlaps itself and self-bonds in presence of heating in a fire to thereby seal itself so as to prevent the entry of air into the cable.

* * * * *